(12) United States Patent
Henck

(10) Patent No.: US 9,221,422 B2
(45) Date of Patent: Dec. 29, 2015

(54) LOCKING MECHANISM FOR PEDESTRIAN HOOD LIFTERS

(71) Applicant: TK Holdings Inc., Armada, MI (US)

(72) Inventor: Jeremy M. Henck, White Lake, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 14/278,578

(22) Filed: May 15, 2014

(65) Prior Publication Data

US 2014/0338525 A1 Nov. 20, 2014

Related U.S. Application Data

(60) Provisional application No. 61/823,905, filed on May 15, 2013.

(51) Int. Cl.
*F15B 15/26* (2006.01)
*B60R 21/38* (2011.01)
*F15B 15/19* (2006.01)

(52) U.S. Cl.
CPC ............... *B60R 21/38* (2013.01); *F15B 15/261* (2013.01); *F15B 15/19* (2013.01)

(58) Field of Classification Search
CPC .................................. F15B 15/19; B60R 21/38
USPC ........................................................ 92/15, 23
See application file for complete search history.

(56) References Cited

U.S. PATENT DOCUMENTS

| 3,032,807 | A | * | 5/1962 | Lanius, Jr. ................. 16/97 |
| 3,199,288 | A | * | 8/1965 | Nahas ................. 92/23 |
| 4,309,027 | A | | 1/1982 | Molders et al. |
| 6,520,276 | B2 | * | 2/2003 | Sasaki et al. ................. 180/274 |
| 7,857,087 | B2 | | 12/2010 | Matsuura et al. ............. 180/274 |
| 7,946,376 | B2 | | 5/2011 | Hayashi et al. |
| 2004/0211313 | A1 | | 10/2004 | Yamaguchi |
| 2005/0257980 | A1 | | 11/2005 | Green et al. ................. 180/274 |
| 2009/0223360 | A1 | | 9/2009 | Aoki et al. ................. 92/15 |

FOREIGN PATENT DOCUMENTS

| JP | 2003191818 | 7/2003 |
| JP | 2008056120 | 8/2006 |
| JP | 2011208738 | 10/2011 |

OTHER PUBLICATIONS

Office Action U.S. Appl. No. 14/278,924, Dated: Feb. 19, 2015, filed May 15, 2014.

* cited by examiner

*Primary Examiner* — Thomas E Lazo
(74) *Attorney, Agent, or Firm* — L.C. Begin & Associates, PLLC.

(57) ABSTRACT

A hood lifting mechanism includes a housing and a piston rod movably mounted in the housing so as to be extendible from the housing in a first direction. A retainer is secured to an exterior of the housing so as to define a cavity between the housing and the retainer. A locking member is positioned in the cavity and structured to contact the piston rod so as to impede motion of the piston rod in a second direction opposite the first direction.

18 Claims, 5 Drawing Sheets

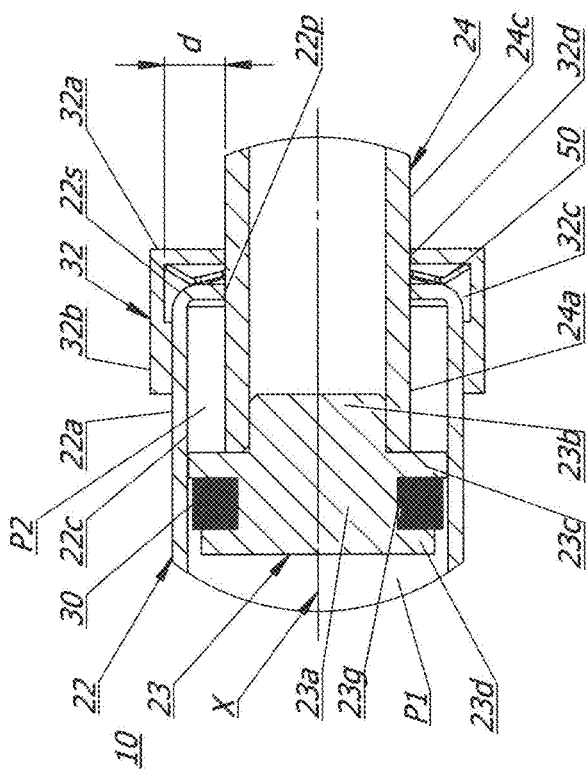
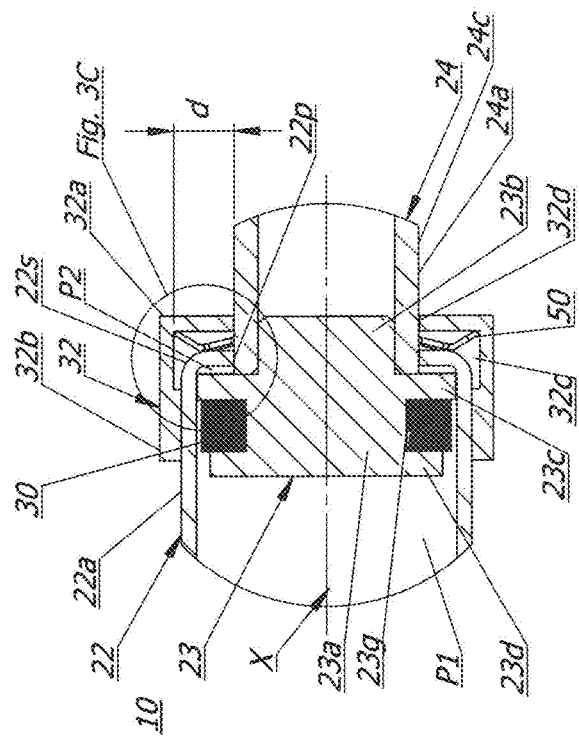
FIG. 2A
FIG. 2B

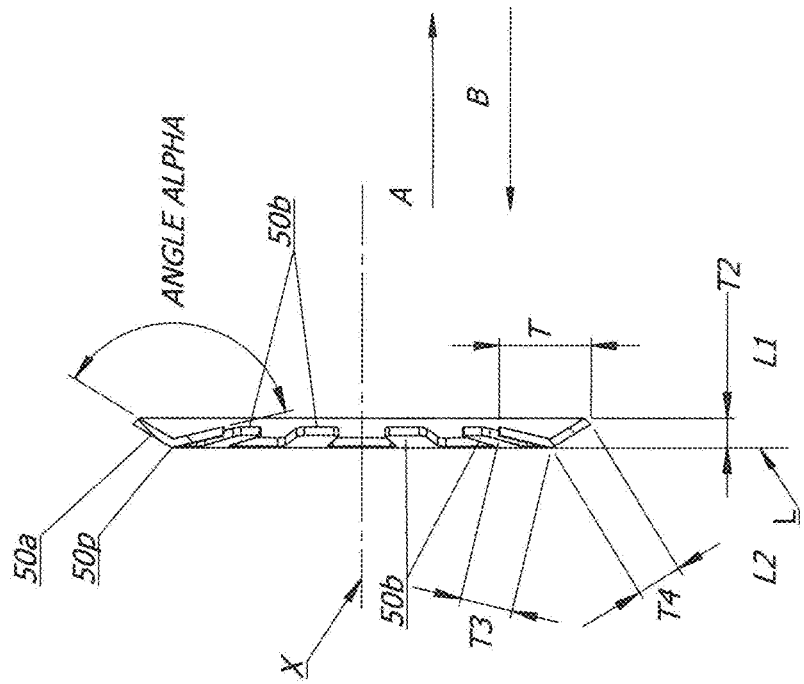
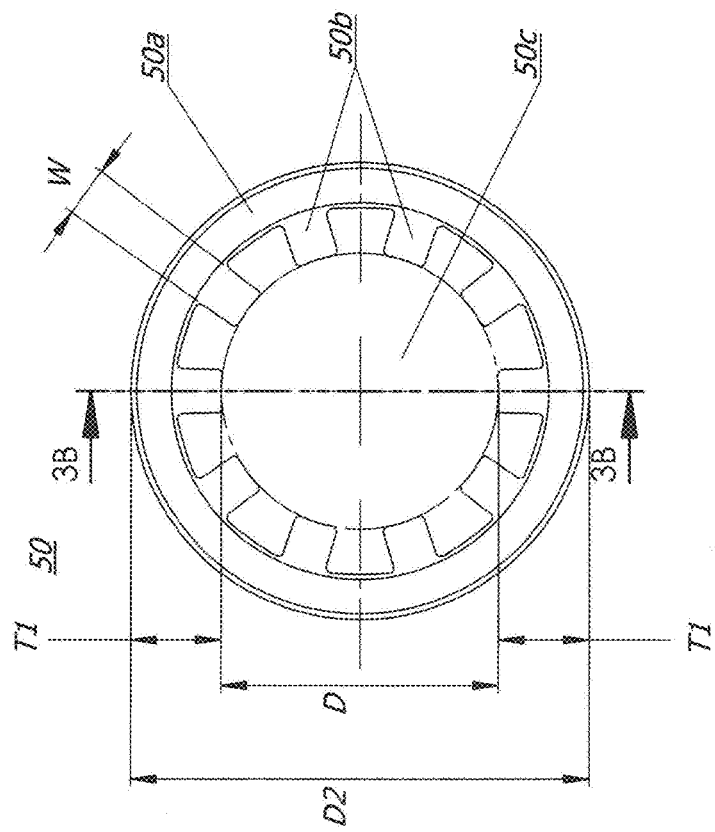

LOCKING MECHANISM FOR PEDESTRIAN HOOD LIFTERS

CROSS-REFERENCE TO RELATED APPLICATIONS

This application claims the benefit of U.S. Provisional Application Ser. No. 61/823,905, filed on May 15, 2013, the disclosure of which is incorporated herein by reference in its entirety.

BACKGROUND OF THE INVENTION

A hood lifting mechanism may be mounted on a motor vehicle for lifting a rear portion of a vehicle hood (proximate the windshield) in a situation where the vehicle collides with a pedestrian. The mechanism may have a moving portion connected to the hood rear portion. Means (for example, a squib, a pneumatic line or other suitable mechanism) are provided for extending the moving portion to lift the hood rear portion connected thereto, upon actuation of the mechanism. When actuated, the mechanism raises the hood rear portion from its normal rest position and supports the hood rear portion in this elevated position. However, when the hood rear portion is raised, forces produced by an impact on the hood by a pedestrian may cause the moving portion of the hood lifting mechanism to retract. There is a need for a mechanism designed to maintain or help maintain the moving portion in its extended position, to prevent or retard this retraction.

SUMMARY OF THE INVENTION

In one aspect of the embodiments described herein, a hood lifting mechanism is provided including a housing and a piston rod movably mounted in the housing so as to be extendible from the housing in a first direction. A retainer is secured to an exterior of the housing so as to define a cavity between the housing and the retainer. A locking member is positioned in the cavity and structured to contact the piston rod so as to impede motion of the piston rod in a second direction opposite the first direction.

In another aspect of the embodiments of the described herein, a hood lifting mechanism is provided including a housing and a piston rod movably mounted in the housing and extendible from the housing. A locking mechanism, positioned exterior of the housing, is provided for impeding motion of the piston rod in a retraction direction of the piston rod.

In another aspect of the embodiments of the described herein, a hood lifting mechanism is provided including a housing and a piston rod movably mounted in the housing so as to be extendible from the housing in a first direction. A retainer is secured to an exterior of the housing so as to define a cavity between the housing and the retainer. A locking member is positioned in the cavity. The locking member includes an outer portion and at least one tab extending from the outer portion at an intersection thereof. The outer portion extends from the intersection in the first direction, and the at least one tab extends from the intersection in the first direction to contact the piston rod.

BRIEF DESCRIPTION OF THE DRAWINGS

FIG. 2A is a magnified cross-sectional side view of a portion of the hood lifting mechanism shown in FIG. 1, after activation of the mechanism and prior to a piston of the mechanism reaching its full stroke.

FIG. 2B is a cross-sectional side view of the portion of the hood lifting mechanism shown in FIG. 2A, after activation of the mechanism and after the piston reaching its full stroke.

FIG. 3A is a front view of one embodiment of a locking member incorporated into the locking mechanism shown in FIGS. 1-2B.

FIG. 3B is a cross-sectional side view of the locking member shown in FIG. 3A.

DETAILED DESCRIPTION

Figure 1:
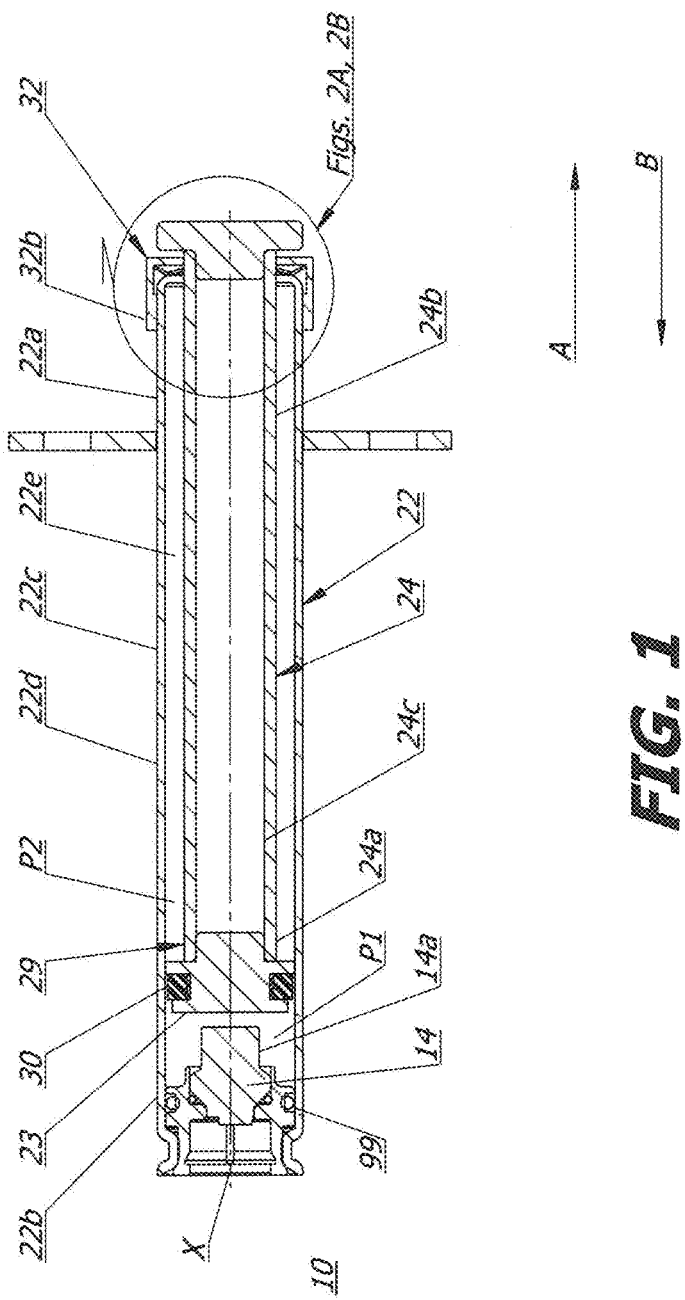
FIG. 1 is a cross-sectional side view of a hood lifting mechanism incorporating a locking mechanism in accordance with an embodiment described herein.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-2b show a cross-sectional side views of a hood-lifting mechanism 10 in the form of a pressurized gas-powered actuator incorporating a locking mechanism in accordance with an embodiment described herein. In FIG. 1, the actuator is shown a condition prior to activation.

The actuator 10 may be mounted to any suitable device or mechanism (for example, a portion of a vehicle hood), if desired, and may be operatively coupled (via piston rod 24, described in greater detail, below) to the device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. As described herein, one possible application for an actuator as described herein is in lifting a portion of a hood of an automotive vehicle.

In the embodiments disclosed herein, actuator 10 has a housing 22 and a piston assembly 29 movably positioned within the housing. Housing 22 has an outermost housing wall 22d defining a first end 22a, a second end 22b, and a body 22c connecting the first and second ends. A longitudinal central axis X extends through the housing 22. Wall 22d also defines a hollow interior 22e of the housing. In the embodiment shown in FIG. 1, housing second end 22b is configured to accommodate a suitable gas generator 14 (for example, a known micro-gas generator) to be inserted and retained therein by crimping, adhesive attachment, or any other suitable method. Alternatively, the gas generator 14 or a portion thereof may be attached to an exterior of housing first end using a suitable retention method. A gas-emitting portion 14a of the gas generator 14 is positioned within the housing so that generated gases flow into the housing interior after activation of the gas generator. If desired, a suitable seal 99 (such as an epoxy seal, o-ring seal or other sealing means) may be provided to prevent or minimize leakage of generated gas between the gas generator 14 and the housing 22 to an exterior of the housing. Housing 22 may be formed from a metallic material or any other suitable material or materials.

In the embodiments shown herein, piston assembly 29 includes a piston 23 slidably positioned within the housing, and a piston rod 24 attached to the piston so as to move in conjunction with the piston. In a manner known in the art, activation of the pressurized gas source 14 results in the production of compressed gas, which propels the piston assembly 29 in direction "A".

In the embodiment shown in FIGS. 1-2b, piston 23 and piston rod 24 travel along axis X during movement of the piston and piston rod within the housing. The hood lifting mechanism is structured so that piston 23 and the associated piston rod 24 move in a piston rod deployment or extension direction (direction "A" in the drawings). The mechanism also incorporates a locking mechanism as described herein for impeding motion of the piston rod in a piston rod retraction direction (direction "B" in the drawings) opposite the extension direction.

FIG. 2A shows the piston 23 and a portion of the piston rod 24 of FIG. 1 after activation of the hood lifting mechanism to lift a rear portion of a vehicle hood (not shown), but prior to a time when a full stroke of the piston rod has been achieved (i.e., prior to a time when the piston 23 has reached the full extent of its travel within the housing 22). FIG. 2b shows the piston 23 after is has reached the full extent of its travel within the housing 22.

One or more retention features on the housing 22 are designed to engage complementary features on the piston 23 to limit the travel or stroke of the piston rod during actuation, and to retain the piston in the housing. In the embodiment shown in FIGS. 2A and 2B, a portion of housing first end 22a is formed so as to define a shoulder or end wall 22s including an opening 22p at the end of the housing through which piston rod 24 extends. Opening 22p may be drilled or otherwise formed in the shoulder 22s. Opening 22p may be sized or otherwise structured to laterally constrain or support to the piston rod 24 as portions of the rod move into and out of the housing through opening 22p. Piston 23 may abut shoulder 22s when the piston reaches the end of its travel within housing 22.

Referring to FIGS. 1-2b, piston 23 has a body portion 23a, an end projection 23b extending from the body portion, a first flange 23c projecting from the body portion adjacent the end projection, and a second flange 23d projecting from the body portion at a location spaced apart from first flange 23c. Flange 23c forms a close sliding fit with housing wall 22c to aid in preventing escape of pressurized fluid from inside the housing.

Body portion 23a and flanges 23c and 23d define therebetween a cavity or groove 23g structured for receiving therein an o-ring or other resilient seal, generally designated 30. In a known manner, seal 30 resiliently slidingly contacts the interior surfaces of housing wall 22d to aid in preventing escape or leakage of pressurized fluid past piston 23 during motion of piston 23 within housing 22. When piston 23 is positioned in housing 22 with seal 30 contacting the housing wall interior surfaces, the region of contact between the seal and the housing wall defines a boundary between a higher pressure side P1 of the piston and a lower pressure side P2 of the piston.

End projection 23b is sized to engage wall 24c of a piston rod 24 in an interference fit, or for otherwise enabling or facilitating attachment of the piston rod 24 to the piston 23. Alternatively, to help ensure that the piston rod 24 remains attached to the piston 23 during operation of the hood lifting mechanism, piston rod 24 may be attached to piston 23 by welding, adhesive attachment, or any other suitable method.

Alternatively, the piston 23 and piston rod 24 may be formed integrally together, as a single piece, for example, by casting, molding, or any other suitable method.

As stated previously, one or more retention features on the piston 23 are designed to engage complementary features on housing 22 to limit the travel or stroke of the piston rod during actuation, and to retain the piston in the housing. In the embodiment shown in FIGS. 2a and 2b, this retention function is performed by first flange 23c abutting housing shoulder 22s when the piston 23 is at full stroke, as described herein. However, any of a variety of other retention features or mechanisms may also be utilized. Piston 23 may be formed from a metallic material or any other suitable material or materials.

Piston rod 24 is the mechanism through which the actuator force is transmitted to an element (for example, a portion of a hood of a vehicle (not shown)) connected to the piston rod. Piston rod 24 is attached to piston 23 so as to move in conjunction or correspondence with the piston. In the embodiment shown in FIGS. 1-2B, piston rod 24 is formed from a hollow tubular member having a first end 24a, a second end 24b, and a wall 24c connecting the first and second ends. Alternatively, piston rod 24 may be formed from a solid rod or bar with a cavity formed therein for engaging piston end projection 23b in a manner described herein. Alternatively, piston rod 24 may be formed from a solid rod or bar, and a complementary cavity (not shown) formed in piston 23 for receiving end 24a of the piston rod therein. The connection between piston 23 and piston rod 24 may also be formed using a threaded connection between the parts or using any other mechanism suitable for the purposes described herein. The piston rod may also have any particular length, diameter, shape and/or other characteristic(s) suitable or necessary for a particular application. Piston rod 24 may be formed from a metallic material or any other suitable material or materials.

In the embodiments described herein, a locking member retainer 32 is positioned along an exterior of the housing. The retainer is structured to form, in conjunction with the housing, a cavity for positioning of a locking member (described below) therein. In the embodiments shown, the retainer is in the form of a collar attached to an end of housing 22 by welding or any other suitable method. However, the retainer may have any alternative configuration suitable for the requirements of a particular application.

Retainer 32 may serve to reinforce or strengthen the housing end wall 22s against impact forces exerted by the piston 23 contacting the end wall at the end of the piston stroke (i.e., at full stroke). In the embodiment shown in FIGS. 2A and 2B, retainer 32 has a base portion 32a and a wall 32b extending in a first direction from an edge of the base portion to define a cavity 32c structured for receiving therein a portion of housing first end 22a. Cavity 32c is also structured for receiving and containing therein a locking member 50 (described in greater detail below). Retainer base portion 32a also has an opening 32d formed therein. Opening 32d is coaxial with (or is otherwise aligned with) opening 22p in housing 22 to enable piston rod 24 to extend through the opening. Opening 32d is sized to provide a clearance between the piston rod 24 and edges of the opening, or to otherwise permit the piston rod to slide along the edge of the opening during movement of the piston rod. Retainer 32 may be formed from a metallic material or any other suitable material or materials.

As stated previously, the hood-lifting mechanism embodiments described herein incorporate various mechanisms for impeding motion of the piston rod in a piston rod retraction direction (direction "B" in the drawings) opposite the extension direction, after the piston rod has reached full extension from the housing.

FIGS. 1-2B show a hood-lifting mechanism incorporating a locking mechanism for impeding motion in the piston rod retraction direction (direction "B" in the drawings). In the embodiment shown in FIGS. 1-2B, a locking member 50 is positioned in cavity 32c and is structured to lockingly engage the piston rod 24 when a force in direction "B" is applied to the piston rod. In the embodiment shown, locking member 50 is in the form of a ring having a continuous, circular outer portion 50a and a plurality of tabs 50b extending generally radially inwardly from the outer portion. Alternatively, locking member 50 may any of a variety of other suitable shapes, depending on the needs of a particular application.

Referring to the drawings, prior to activation of the hood lifting mechanism, piston rod 24 extends through opening 50c and deflects tabs 50b in direction "A". Referring to FIGS. 3A and 3B, in the embodiment shown, tabs 50b have equal lengths T1 and combine to define a diameter or extent D of an opening 50c extending through the locking member interior. When the locking member 50 is removed from the hood lifting mechanism and is in an undeflected condition, a radial distance T from a radially outermost edge of the locking member to the end of a tab 50b is equal to one half of the difference between the outermost diameter D1 of locking member 50 and the diameter D of the opening 50c extending through the locking member. Lengths T1 are dimensioned such that diameter D is slightly smaller than an outer diameter of piston rod 24. Thus, insertion of the piston rod into the opening 50c defined by the ends of tabs 50b causes a deflection of the tab ends, in the direction in which the piston rod is inserted into the opening 50c. For example, if the piston rod 24 is inserted into opening 50c in direction "A", tabs are also deflected in direction "A".

In the embodiment shown in FIGS. 3A and 3B, tabs 50b extend from outer portion 50a with a slight bias in direction "A". In this embodiment, direction "A" is the direction in which piston rod 24 moves within the housing and exits the housing to lift the hood after activation of the mechanism. In addition, outer portion 50a similarly extends in direction "A" from the intersections formed between the outer portion and the tabs. In this embodiment, a locking member apex 50p is defined by portions of the ring residing along a plane L, along which the tabs 50b intersect the outer portion 50a. Elements of locking member 50 are also structured so enable the tabs 50b to deflect in direction "A" during motion of the piston rod in direction "A" without contacting retainer base portion 32a. In one embodiment, elements of locking member 50 (and particularly tabs 50b) are structured so as to minimize the resistance to motion of the piston rod in direction "A" exerted by ends of tabs 50b. Locking member 50 may be formed from a metallic material or any other suitably resilient material or materials.

Figure 3C:
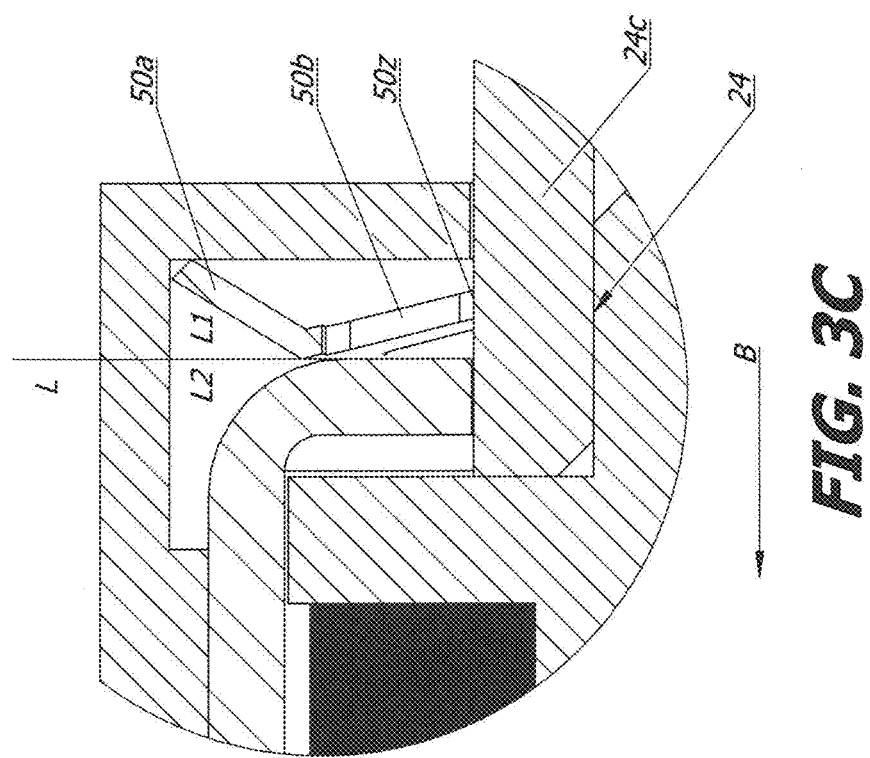
FIG. 3C is a magnified view of a portion of the view shown in FIG. 2B, showing engagement between a tab of the locking member and an outer surface of piston rod 24.

FIG. 3C is a magnified view of a portion of the view shown in FIG. 2B, showing engagement between one of tabs 50b and an outer surface of piston rod 24. Referring to FIG. 3C, tabs 50b may be provided with relatively sharp edges 50z at free ends thereof. These edges may be structured so as to tend to bite into the piston rod outer surface (or to otherwise maximize the engagement pressure and frictional forces between the piston rod outer surface and the tabs) when an attempt is made to move the rod in a direction (direction "B" in the drawings) opposite the rod extension direction.

Optimum values of parameters such as the widths w of the tabs, the number of tabs, the material thickness, grade and/or temper and other pertinent parameters for a given application may be iteratively determined through analysis and/or testing, using known methods. These parameters may be defined and/or dimensioned so as to achieve a desired balance between the friction force applied by the locking member to the piston rod 24 during extension of the rod, and the locking friction force applied to the piston rod in response to an applied retraction force (in direction "B").

Generally, the locking member is dimensioned so as to minimize the overall part thickness T2 prior to activation of the hood lifting mechanism, while maintaining functionality. In a particular embodiment, T2 is 1.4 millimeters when the locking member is in an unstressed or unloaded condition.

In the embodiment shown in the drawings, tabs 50b have uniform width dimensions w. However, if desired, one or more of the tabs 50b may have a width tapering from a relatively greater dimension closer to the outer portion 50a to a relatively smaller dimension at the free end of the tab.

A radius may be provided at each intersection of 50b with 50a, to help minimize stress concentrations. In a particular embodiment, the radius is within the range 0.2 to 0.5 mm.

Referring to FIG. 3B, in a particular embodiment, an included angle θ between each side of tabs 50b and outer portion 50a is greater than 90 degrees. Generally, the locking member 50 is dimensioned so as to minimize the outer diameter D2 of outer portion 50a. In a particular embodiment, the outer diameter is 21 millimeters.

Generally, the length T3 of each of tabs 50b is less than or equal to (T/1;2). It has been found that this aids in preventing buckling or other undesirable deflection of portions of the locking member during operation of the hood lifting mechanism. In a particular embodiment, a sum of length T4 of outer portion 50a taken along a surface of outer portion 50a and length T3 taken along a surface of the tab 50b is equal to 5 millimeters.

Figure 4:
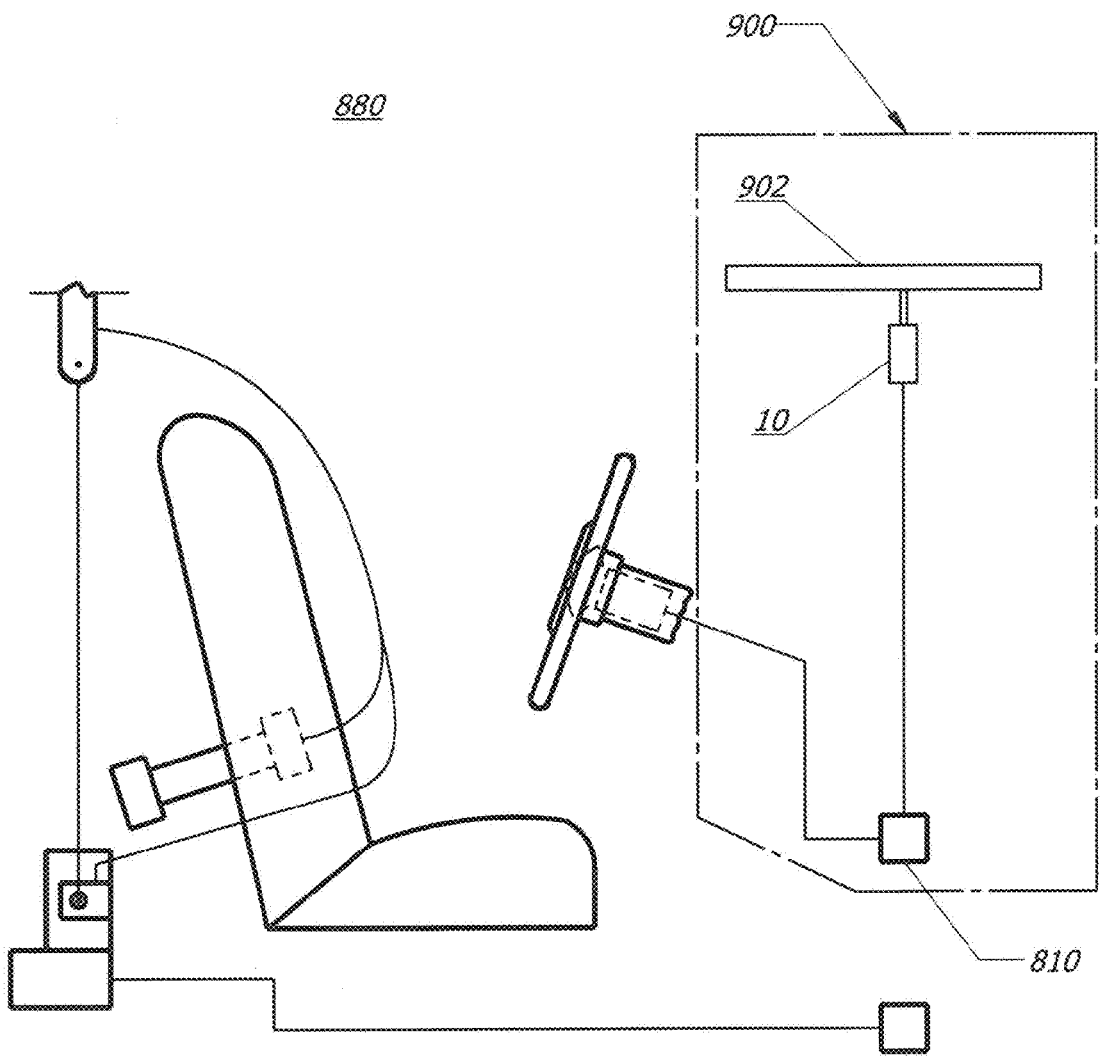
FIG. 4 is a schematic view of a portion of a pedestrian protection system installed in a vehicle and incorporating a hood-lifting device including a locking mechanism in accordance with an embodiment described herein.

FIG. 4 is a schematic view of a portion of a pedestrian protection system 900 installed in a vehicle 880 and incorporating a hood-lifting device 10 including a locking mechanism in accordance with an embodiment described herein. In this embodiment of the pedestrian protection system 900, a vehicle mounted sensor 810 detects contact between the vehicle and a pedestrian (not shown). Responsive to this detected contact, an activation signal is sent to the hood-lifting mechanism 10, resulting in activation of the gas generator or otherwise releasing pressurized gases into the interior of housing 22 to produce extension of the piston rod 24 from the housing, as previously described. The extending piston rod 24 then raises the rear portion of the hood 902. The hood-lifter activation signal may be sent from the sensor 810 or from a suitably-configured controller (not shown) which receives the vehicle-pedestrian contact signal from sensor 810 and generates the activation signal in response thereto.

When the hood lifting mechanism is activated, piston 23 and its associated piston rod 24 are moved in direction "A" by forces exerted on piston 23 by pressurized gases or another suitable mechanism. Because tabs 50b extend in the extension direction of the piston rod when the rod is extending, the edges 50z of the tabs slide easily along the surface of the piston rod when the rod moves in direction "A". When the piston 23 reaches full travel, piston flange 23c abuts housing shoulder 22s, whereby further motion of the piston in direction "A" is prevented. FIG. 2B shows the piston 23 and piston rod 24 in an extended state of the hood lifting mechanism, when the piston 23 has reached the full extent of its travel within the housing 22.

If a pedestrian impinges on the portion of the hood supported by piston rod 24 when the piston rod is extended from the housing, a retracting or counter force acting in direction "B" will be exerted on the piston rod. In this case, as the piston rod tends to move in direction "B", friction between the piston rod and the ends of tabs 50b will tend to cause the tabs to deform or deflect in direction "B". When a load is applied in direction "B", friction generated by contact of tabs 50b to piston rod 24 causes the apex plane L of retention member 50 to be forced against housing shoulder 22s, and the outermost edge of the locking member is forced into a corner defined by retainer base portion 32a and retainer wall 32b. Tabs 50b subsequently tend to deflect or pivot at apex plane L, which further increases the friction between the tabs 50b and the piston rod. Tabs continue to deflect in direction "B" until sufficient friction is created to stop movement of the hood.

Due to the biasing or deflection of tabs 50b in direction "A" to a first side L1 of plane "L", the fact that the opening 50c defined by the tabs has a smaller diameter than the piston outer diameter, and the gripping effect (if any) on the piston rod outer surface by edges of the tabs, tabs 50b cannot deflect past piston rod 24 to a second side L2 of plane "L" opposite side L1 without deforming along their respective lengths. The forces exerted in attempting to move piston rod 24 in direction "B" will be transmitted along the lengths of the tabs 50b to the locking member outer portion 50a, and thence to the structure enclosing the locking member 50. In this manner, locking member 50 prevents or impedes motion of the piston rod in a direction back into the housing 22 after activation of the hood lifter. Resistance to motion of the piston rod in direction "B" may continue until application of a force to the piston rod in direction "B" sufficient to cause tabs 50b to plastically deform.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A hood lifting mechanism comprising:
   a housing;
   a piston rod movably mounted in the housing so as to be extendible from the housing in a first direction;
   a retainer secured to an exterior of the housing so as to define a cavity between the housing and the retainer; and
   a locking member positioned in the cavity and structured to contact the piston rod so as to impede motion of the piston rod in a second direction opposite the first direction.

2. The mechanism of claim 1 wherein the locking member includes at least one tab structured to extend in the first direction when the at least one tab is in contact with the piston rod.

3. The mechanism of claim 2 wherein the at least one tab is structured such that a movement of the piston rod in the second direction causes the at least one tab to deflect in the second direction.

4. The mechanism of claim 2 wherein the locking member includes a plurality of tabs structured to extend in the first direction when the plurality of tabs is in contact with the piston rod.

5. The mechanism of claim 1 wherein the locking member includes an outer portion (50a) and at least one tab (50b) extending from the outer portion toward the piston rod so as to form an apex bend (50p) between the at least one tab and the outer portion prior to contact between the piston rod and the locking member, and wherein the locking member is structured such that the bend (50p) is urged against the housing responsive to motion of the piston rod in the second direction.

6. A vehicle incorporating a hood-lifting mechanism in accordance with claim 1.

7. The mechanism of claim 1 wherein the housing has a central axis, and wherein a radially outermost dimension of the retainer cavity is at least equal to a radially outermost dimension of a portion of the housing exterior to which the retainer is secured.

8. The mechanism of claim 7 wherein the radially outermost dimension of the retainer cavity is greater than the radially outermost dimension of the portion of the housing exterior to which the retainer is secured.

9. A hood lifting mechanism comprising:
   a housing;
   a piston rod movably mounted in the housing and extendible from the housing; and
   a locking mechanism, positioned exterior of the housing, for impeding motion of the piston rod in a retraction direction of the piston rod, wherein the locking mechanism comprises a locking member operatively coupled to the housing.

10. The mechanism of claim 9 wherein the locking member including at least one tab structured to extend in an extension direction of the piston rod from the housing when the at least one tab is in contact with the piston rod.

11. The mechanism of claim 10 wherein the at least one tab is structured to extend in an extension direction of the piston rod from the housing when the at least one tab is not in contact with the piston rod.

12. The mechanism of claim 10 wherein the locking mechanism further comprises a retainer formed separately from the housing and attached to the housing so as to form a cavity therebetween, and wherein the locking member is positioned in the cavity.

13. The mechanism of claim 10 wherein the locking member includes a plurality of tabs structured to extend in the extension direction of the piston rod when the plurality of tabs is in contact with the piston rod.

14. The mechanism of claim 13 wherein the tabs of the plurality of tabs have equal lengths.

15. The mechanism of claim 9 wherein the retainer has a base portion and a wall extending in a first direction from an edge of the base portion to define a cavity structured for receiving therein a portion of an end of the housing, and wherein the wall resides exterior of an outer wall of the housing.

16. A vehicle incorporating a hood-lifting mechanism in accordance with claim 9.

17. A hood lifting mechanism comprising:
   a housing;
   a piston rod movably mounted in the housing so as to be extendible from the housing in a first direction;
   a retainer secured to an exterior of the housing so as to define a cavity between the housing and the retainer; and
   a locking member positioned in the cavity, the locking member including an outer portion and at least one tab extending from the outer portion at an intersection thereof, wherein the outer portion extends from the intersection in the first direction and the at least one tab extends from the intersection in the first direction to contact the piston rod.

18. A vehicle incorporating a hood-lifting mechanism in accordance with claim 17.

* * * * *

UNITED STATES PATENT AND TRADEMARK OFFICE
CERTIFICATE OF CORRECTION

PATENT NO.       : 9,221,422 B2
APPLICATION NO.  : 14/278578
DATED            : December 29, 2015
INVENTOR(S)      : Henck It is certified that error appears in the above-identified patent and that said Letters Patent is hereby corrected as shown below:

In the Specification

Column 3; Line 28;    Please delete "is" and insert --it--.

Column 5; Line 14;    Please insert --be-- after may.

Column 6; Line 28;    Please delete "(T/1;2)" and insert --(T1/2)--.

Signed and Sealed this
Twenty-third Day of August, 2016

Michelle K. Lee
*Director of the United States Patent and Trademark Office*